United States Patent
Ketsman et al.

(10) Patent No.: US 10,463,064 B2
(45) Date of Patent: Nov. 5, 2019

(54) SYRUP PURIFICATION BY CAPACITIVE DEIONIZATION

(71) Applicant: CARGILL, INCORPORATED, Wayzata, MN (US)

(72) Inventors: Joost Ketsman, Oudenaarde (BE); Luigi Nataloni, Bologna (IT); Ronny Leontina Marcel Vercauteren, Beveren (BE)

(73) Assignee: CARGILL, INCORPORATED, Wayzata, MN (US)

( * ) Notice: Subject to any disclaimer, the term of this patent is extended or adjusted under 35 U.S.C. 154(b) by 339 days.

(21) Appl. No.: 14/771,315

(22) PCT Filed: Mar. 5, 2014

(86) PCT No.: PCT/US2014/020564
§ 371 (c)(1),
(2) Date: Aug. 28, 2015

(87) PCT Pub. No.: WO2014/138171
PCT Pub. Date: Sep. 12, 2014

(65) Prior Publication Data
US 2016/0000120 A1 Jan. 7, 2016

(30) Foreign Application Priority Data
Mar. 6, 2013 (EP) .................... 13001116

(51) Int. Cl.
*A23L 5/00* (2016.01)
*A23L 5/20* (2016.01)
(Continued)

(52) U.S. Cl.
CPC ................ *A23L 5/00* (2016.08); *A23L 5/27* (2016.08); *A23L 5/30* (2016.08); *A23L 7/00* (2016.08);
(Continued)

(58) Field of Classification Search
CPC ............ A23L 5/30; A23L 29/30; A23L 29/37; B01D 61/44; B01J 38/74; B01J 38/00
See application file for complete search history.

(56) References Cited

U.S. PATENT DOCUMENTS 3,692,580 A   9/1972   Hirao et al.
4,173,514 A * 11/1979 Kruse ..................... C07C 31/26
                                                            435/94

(Continued)

FOREIGN PATENT DOCUMENTS

| CN | 102617287 A | 8/2012 |
| WO | WO2009/022237 A2 | 2/2009 |
| WO | WO2014/138171 | 9/2014 |

OTHER PUBLICATIONS

PCT International Search Report, PCT/US2014/020564, dated May 22, 2014, 2 pages.
(Continued)

*Primary Examiner* — Assaf Zilbering

(57) ABSTRACT

The invention relates to a process for purifying syrups. The process comprises removing charged components from the syrup by passing said syrup through a capacitive deionization cell. The present invention further relates to the use of capacitive deionization to recover charged components from syrups. In particular the syrups are mannose, fructose and sorbitol containing syrups.

20 Claims, 1 Drawing Sheet

(51) Int. Cl.
  *A23L 5/30*  (2016.01)
  *A23L 7/00*  (2016.01)
  *B03C 9/00*  (2006.01)
  *A23L 29/30*  (2016.01)
  *B01D 61/44*  (2006.01)
  *B01J 38/00*  (2006.01)
  *B01J 38/74*  (2006.01)
  *C13B 20/18*  (2011.01)

(52) U.S. Cl.
  CPC ............... *A23L 29/30* (2016.08); *A23L 29/37* (2016.08); *B01D 61/44* (2013.01); *B03C 9/00* (2013.01); *C13B 20/18* (2013.01); *A23L 29/35* (2016.08); *A23V 2002/00* (2013.01); *B01J 38/00* (2013.01); *B01J 38/74* (2013.01)

(56) References Cited

U.S. PATENT DOCUMENTS

| | | |
|---|---|---|
| 5,425,858 A | 6/1995 | Farmer |
| 5,868,915 A | 2/1999 | Ganzi et al. |
| 5,954,937 A | 9/1999 | Farmer |
| 5,955,394 A | 9/1999 | Kelly |
| 6,017,433 A | 1/2000 | Mani |
| 6,056,980 A | 5/2000 | Unno et al. |
| 6,778,378 B1 * | 8/2004 | Andelman .......... C02F 1/46109 |
| | | 361/302 |
| 2010/0065438 A1 | 3/2010 | Sullivan |
| 2012/0088941 A1 | 4/2012 | Soest et al. |

OTHER PUBLICATIONS

PCT International Search Report, PCT/US2014/020564, dated Dec. 5, 2014, 1 page.

European Search Report of application No. 13001116.6, dated Sep. 4, 2013, 2 pages.

Christopher J. Gabelich et al., "Electrosorption of Inorganic Salts from Aqueous Solution Using Carbon Aerogels", Environmental Science & Technology, vol. 36, No. 13, (2002), pp. 3010-3019.

Zeng et al., "A literature review of the recovery of molybdenum and vanadium from spent hydrodesulphurisation catalysts: Part II: Separation and purification", Hydrometallurgy, Elsevier, vol. 98, Issues 1-2, Aug. 2009, pp. 10-20.

Sung-Jae Kim, "Removal of acetic acid and sulfuric acid from biomass hydrolyzate using a lime addition-capacitive deionization (CDI) hybrid process" Process Biochemistry, Elsevier, vol. 47, Issue 12, Dec. 2012, pp. 2051-2057.

* cited by examiner

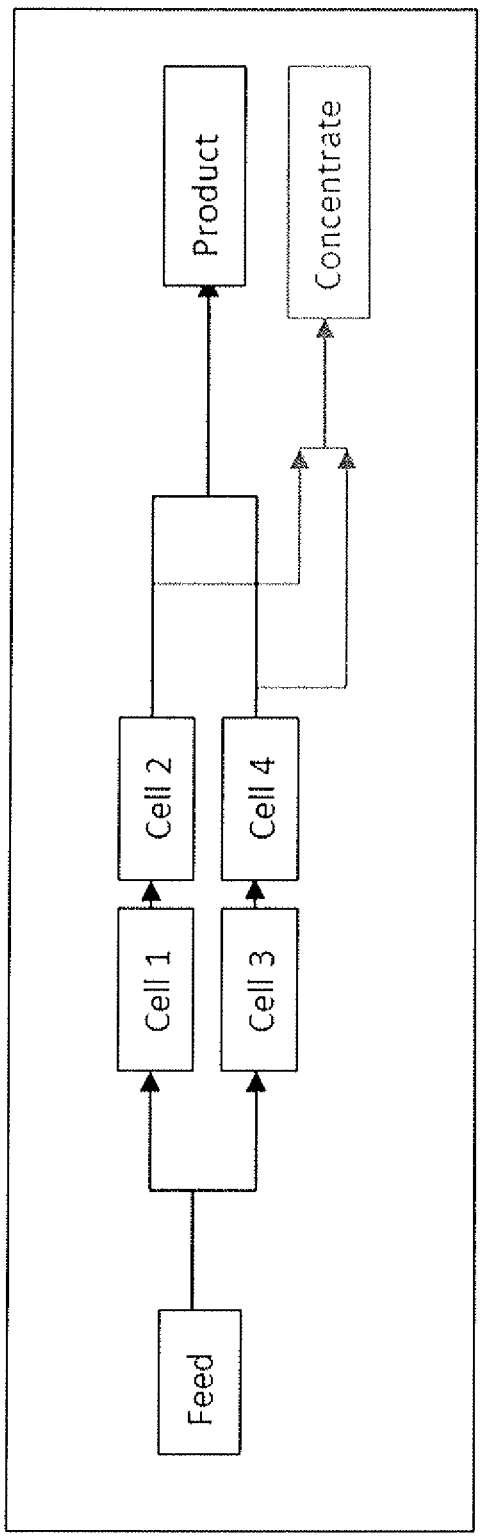

SYRUP PURIFICATION BY CAPACITIVE DEIONIZATION

CROSS-REFERENCE TO RELATED APPLICATIONS

This application is a national phase application of international application PCT/US2014/020564, filed Mar. 5, 2014, which claims priority to European Patent Application No. EP13001116.6, filed Mar. 6, 2013, both of which are hereby incorporated by reference in their entirety.

FIELD OF THE INVENTION

The invention relates to a process for removing charged components from syrup comprising passing said syrup through a capacitive deionization cell. More particularly, the invention relates to a process for removing and recovering charged components from syrup comprising passing said syrup through a capacitive deionization cell.

BACKGROUND OF THE INVENTION

Starch and products derived from it are very important products especially in the food industry. For the food industry, starch is commonly converted into different kinds of syrups such as dextrose syrups, fructose syrups, mannose syrups and the like. These can be used as basic carbon sources in processes for the production of other kinds of syrups, which in turn may serve to produce solidified or crystalline products. These processes include catalytic reactions such as isomerisation, epimerisation, hydrogenation. For example, dextrose in dextrose syrup can be enzymatically isomerised into fructose by the action of magnesium as a catalyst. After catalytic reaction, the end product is purified by removal of the catalyst by using ion exchange resins.

One of the problems with current purification methods is that they result in high amounts of waste. In particular, the catalysts removed with the resin regeneration step are discharged as waste streams. This has a negative impact on the environment and on the quality of waste water streams coming from industry. It is not economically interesting to recover the catalysts from the waste streams. The fact that high cost products such as catalysts are lost in waste streams increases the total cost of the process and requires a very controlled dosage of the catalyst which otherwise would be lost if dosed in excess. There is thus currently a necessity to compromise between reaction efficiency and loss of catalyst.

There is thus a need for an improved process for purification of syrups containing charged components, such as catalyst in the form of salts. There is a need for a process having a higher catalyst recovery yield and a lower environmental impact than current purification processes.

SUMMARY OF THE INVENTION

The present invention relates to a process for removing charged components from a syrup comprising passing the syrup through a capacitive deionization cell.

The present invention further relates to a use of capacitive deionization to recover charged components from a syrup.

DESCRIPTION OF FIGURES

FIG. 1 is a schematic view of a CDI unit where CDI cells are used in two groups (group I: cell 1 and cell 2, group II: cell 3 and cell 4) of two cells in series, said two groups running in parallel.

DETAILED DESCRIPTION

The present invention relates to a process for removing charged components from a syrup comprising passing the syrup through a capacitive deionization cell. A purified syrup is obtained at the outlet of the process. The purified syrup can be used as such in different kind of applications such as in food applications or it can be further processed (drying, crystallisation and the like) before any further use.

Syrup

A syrup for the purpose of the present invention is a liquid composition comprising one or more sweetener. The syrup is thus a sweetener containing syrup.

The syrup can comprise from 10 to 90 weight/weight %, from 15 to 85 w/w %, from 20 to 80 w/w %, from 25 to 70 w/w %, from 25 to 60 w/w %, from 30 to 50 w/w %, from 35 to 45 w/w % of sweetener. The syrup can be obtained by conventional starch hydrolysis process. The syrup can be obtained by dilution of syrup or powder sweetener with water, preferably with demineralised water to obtain the desired dry substance. Alternatively, the dry substance can be increased by evaporation.

Preferably, the sweetener is a carbohydrate (i.e. the syrup is a carbohydrate containing syrup) or a polyol (i.e. the syrup is a polyol containing syrup). The sweetener can be carbohydrate and polyol. More preferably the sweetener is the product of a reaction of another sweetener, preferably a catalytic reaction of another sweetener.

Carbohydrates are, by definition, hydrates of carbon comprising carbon and water. Preferred carbohydrates for the purpose of the present invention are glucose, fructose, dextrose, mannose. More preferred carbohydrates are fructose and mannose. Thus more preferably, the syrup is a fructose containing syrup or a mannose containing syrup.

Polyols are sugar alcohols and may include sorbitol, maltitol, mannitol, galactitol, isomalt. Preferably the polyol is sorbitol. Thus preferably, the syrup is a sorbitol containing syrup.

As mentioned above, the sweetener can be a carbohydrate or a polyol resulting from a reaction (for example a catalytic reaction) of another sweetener, which is preferably a carbohydrate such as glucose, dextrose, fructose, mannose or maltose. This sweetener is preferably in the form of a syrup comprising from 10 to 90 weight/weight %, from 15 to 85 w/w %, from 20 to 95 w/w %, from 25 to 95 w/w %, from 30 to 95 w/w %, from 35 to 95 w/w %, from 40 to 95 w/w %, from 45 to 95 w/w %, from 50 to 95 w/w %, from 55 to 95 w/w %, from 60 to 95 w/w %, from 65 to 95 w/w %, from 70 to 95 w/w %, from 75 to 95 w/w %, from 80 to 95 w/w % of the sweetener. In turn, this sweetener can itself result from a (catalytic) reaction of another sweetener.

Glucose, dextrose and maltose (in crystalline or syrup form) are usually commercially produced by enzymatic starch hydrolysis and/or acid starch hydrolysis. Preferably dextrose is obtained from enzymatic starch hydrolysis comprising liquefaction and saccharification. Starch can be from cereals, root plants such as potatoes or cassava, fruits and vegetables such as bananas, peas and the like. Preferably however starch is derived from cereals such as wheat, corn, sago, barley, rice, oat, and the like. More preferably the cereal is wheat and/or corn.

Sources of fructose include fruits, vegetables (including sugar cane), and honey. Fructose is often further concentrated from these sources. Fructose can also be obtained from isomerisation of glucose or dextrose.

Mannose is usually commercially produced by epimerisation of glucose or dextrose.

Charged Components

Charged components for the purpose of the present invention can be charged molecules such as proteins; organic or inorganic salts; short chain fatty acids; long chain fatty acids; (lyso)phospholipids; lecithin; colour bodies; flavour bodies; minerals; organic acids; organic bases and the like. The charged components can be naturally present in the syrup or artificially added to the syrup. More preferably the charged components are salts, even more preferably they are catalysts, organic or inorganic, which have been added to a sweetener syrup in order to have a catalytic reaction of this sweetener. The catalytic reaction can be for example an isomerisation, an epimerisation or a hydrogenation reaction. More particularly, the catalyst can be a magnesium salt in the case of isomerisation of glucose or dextrose into fructose; a molybdenum salt in the case of epimerisation of glucose or dextrose into mannose, a nickel salt in the case of hydrogenation of glucose or dextrose into sorbitol.

The magnesium salt can be magnesium sulphate, magnesium bisulfite, magnesium chloride and the like. It can be added as such into a reactor where the catalytic reaction will take place.

The molybdenum salt can be sodium molybdate ($Na_2MoO_4$). It can be added as such into a reactor where the catalytic reaction will take place. It can alternatively be bound on an anionic resin. However, even when bound on an anionic resin, part of the catalyst is released into the reaction product.

The nickel salt can be Raney Nickel. It is used as catalyst during hydrogenation under high pressure and in hydrogen atmosphere. As a result of this traces of this catalyst will be dissolved in the reaction product.

Thus catalytic reaction products contain traces to relatively high amounts of catalyst, which are usually discharged together with waste streams but can be recovered with the process of the present invention.

Usually the dosage of catalysts is very accurate in order to limit their loss during the process. Indeed, with current processes catalysts are removed from the main stream, typically by ion exchange resins, and discharged into waste streams, typically by washing of the resin. Washing is done with solutions containing counter ions such as aqueous salt, acid or alkali solutions, thereby increasing the load of chemicals in the waste stream. This waste causes increased process costs because new catalyst needs to be added regularly. It also causes environmental problems. Recovering catalyst from this waste stream is not cost effective and implies a high technical burden. Thus usually catalysts are discharged in industrial effluents. However, some catalysts cannot be discharged in industrial effluents (nickel for example) and must always be selectively recovered, thereby increasing process costs. Also recovering catalyst often requires a separate installation. With the present invention, the catalyst can be easily recovered after it has been removed from the syrup. There is no need for a separate installation to recover the catalysts. There is no more need for compromising between reaction efficiency and loss of catalyst: accurate dosage of the catalyst is less critical, the catalyst could be dosed in excess without risk of loss. This increases the efficiency of the catalytic reaction. The recovered catalyst can either be reused in the front end of the process for catalytic reaction of sweetener, i.e. the catalyst is recycled. The catalyst can also be recovered and used for other purposes. Thus with the current process, the catalyst can be selectively removed out of the sweetener purification process.

Typically the charged components, in particular catalysts, are present in the syrup in amounts of from 50-150 ppm of the catalyst salt in case of Magnesium salt; around 30 ppm of the catalyst salt in case of molybdenum salt. For nickel salt this can vary depending of the hydrogenation reaction conditions but would be typically around 10-20 ppm of nickel salt in the syrup.

At least 50% of the catalyst present in the syrup can be removed from the sweetener syrup. Preferably at least 60%, more preferably at least 70%, even more preferably at least 80% and most preferably at least 90% of the added catalyst can be removed from the sweetener syrup.

Capacitive Deionization (CDI)

Capacitive deionization cells are well known in the art and are means for purifying or otherwise deionizing saline water. They operate on the basis of an electric field created between two couples of porous carbon electrodes/ion selective membrane between which the water to be purified flows. Positively charged ions are attracted by and bound to the negatively charged electrode and/or negatively charged ions are attracted by and bound to the positively charged electrode. In this way, water coming out of the CDI cell is free from salts initially present.

CDI usually operates in three steps: purification, regeneration and flushing.

Purification: as saline water flows into the cell, the oppositely charged electrodes attract the salt ions and pull them through the selective membranes where they collect on the electrodes. Clean, desalinated water flows out of the CDI cell.

Regeneration: once the surfaces of the electrodes become saturated with ions, they are regenerated by reversing the electrical charge of the electrodes. Since like charges repel, the ions trapped in the electrodes are pushed from the electrodes and become trapped between the 2 ion selective membranes, back into the middle of the couple electrodes/membrane. All the ions which were collected into the electrodes are thus released and are present as a concentrated brine or a concentrate in the channel between the couple electrodes/membrane.

Flushing: the concentrated brine between the two membranes is removed from the cell. The charge of the electrodes is returned and the cell is again ready for purification step.

It has been surprisingly found that CDI can be used to treat and purify syrups. Syrups such as described above, have a different viscosity and behaviour than water which make them more difficult to process. Syrups with viscosity of as high as 20 cP can be processed with the present invention. Viscosity is measured by Brookfield viscometer.

To perform CDI, a preferred CDI cell used for the purpose of the present invention is a cell having carbon electrode (Aerogel), high specific surface area and very low electrical resistivity. A preferred CDI cell has a specific surface area of from 600 to 1100 $m^2/g$, and an electrical resistivity of around 40 m$\Omega$/cm. A preferred unit comprises two groups of 2 CDI cells in series, the two groups operating in parallel, such as shown in FIG. 1. The volumes as indicated below will depend on the specific surface area of the unit used. The values indicated below are for a unit having specific surface area from 600 to 1100 $m^2/g$. The skilled person can easily determine the volumes required for a CDI cell having a different specific surface area.

The process for syrup purification according to the present invention comprises the steps of:
Syrup demineralisation and
Regeneration.

A preferred process for syrup purification comprises the steps of
Optional stabilisation
Syrup demineralisation
Regeneration
Maintenance Syrup Demineralisation Step The syrup (the feed) is passed through the CDI cell at a flow rate of from 50 to 100 l/h. The flow rate will depend on following feed parameters:
  Feed ion load. The higher the ion load the lower the feed flow should be.
  Outlet quality, i.e. low conductivity thus low ion content: the better the outlet quality the lower the feed flow should be.
  Feed solids: higher feed solids will reduce the mobility of the ions in the feed and therefore the feed flow should be preferably reduced.

The suitable flow rate can be determined by the person skilled in the art.

The temperature of the syrup is preferably from 40 to 50° C., more preferably from 40 to 45° C. A temperature higher than 50° C. can damage the CDI cells. Thermal shock in the unit should be prevented by avoiding too fast changes in temperatures.

An increased voltage improves the demineralization performance. The voltage can vary from 0.7-1.4V. A higher voltage is not advisable as it could result in splitting of the water molecules into oxygen and hydrogen gas.

Regeneration Step

When the electrodes become saturated with ions, the syrup coming out of the CDI cell shows increased conductivity meaning that increasingly more ions are present in the syrup leaving the cell. The syrup demineralisation step is then interrupted and the regeneration step can start. The flow of syrup through the CDI cell is interrupted and can be replaced by a flow of water, preferably demineralised water. Preferably the water has the same temperature as the syrup in the production cycle. The replacement with water is however not mandatory as this depends of the further use of the ions. Introduction of water will increase the cost of evaporation of the final product and is therefore not always advisable. Instead of using water for the regeneration step, the sweetener syrup itself can be used. As a result of this the concentration of catalyst ions will be high in this portion of sweetener syrup present in the CDI cell. This portion of sweetener syrup can be reused for example in the catalytic reaction upstream the process. Thereby the amount of fresh catalyst to be added in the catalytic reaction is significantly decreased.

During this regeneration step, ions bound on the electrodes are released from the electrodes into the water or syrup by inverting the electrodes charges.

This step is performed in five subsequent steps:
1. System drain: the unit can be drained empty, preferably by gravity flow. This to recover as much product as possible.
2. System fill: can be done with water or syrup as explained above. Sufficient water or syrup is fed to refill the cells.
3. Regeneration: The power current of the electrodes is inverted and the ions are released into the intercellular water or syrup.
4. Drain: once substantially all ions have been released from the electrodes the water or syrup highly concentrated in ions (the concentrate) can be drained into a separate recovery tank.
5. Restart: After the regeneration step the current of the electrodes is put back into the normal operating mode and the operation is restarted.

The water or syrup containing the catalyst salt can be discharged to waste water treatment. With the present invention, the amounts of salt sent to waste water treatment will be significantly less compared to current resin refining system as in the process of the present invention, no extra salts are required.

Alternatively, the water or syrup containing catalyst salt can be reused upstream the process in the catalytic reaction, as explained above.

Reuse of the water or syrup containing the catalyst salt in the same process is advantageous because:
1. It enables to recycle useful and costly components such as catalysts. In particular, the invention enables to separately recover charged components on the basis of their charge. Therefore, charged components of interest can be removed separately from other charged components and reused. By having different CDI cells in series, different charged components can be eventually removed but at different stages: the potential difference between the electrodes will, in a first stage, attract the higher charged components while lower charged components can be attracted at a later stage, or vice versa.
2. It can be used for the dilution of a high dry substance syrup at the front end of the process. This could be of interest as some catalytic reactions are carried out at lower solids compared to a previous process step.

Optional Stabilisation Step

This step is not required; however, in order to improve the CDI performances, it is preferred to perform a stabilisation step. For this, at least 40 l, preferably at least 60 l, more preferably at least 70 l, even more preferably at least 80 l, yet even more preferably from 80 to 120 l, most preferably from 100 to 120 l of water is fed through the CDI cell before the first feed of syrup. Preferably the flow rate of the water is 80 l/h or less, more preferably from 75 l/h to 65 l/h. The water preferably has a temperature of from 40-45° C., preferably as close as possible to the temperature of the syrup in the demineralisation step. Preferably the temperature is regulated and kept constant during the stabilisation step to avoid thermic shocks in the CDI cell membranes. This can be achieved using for example a heat exchanger. Water is preferably demineralised water.

Maintenance Step

This step is performed every 2-20 syrup cycle, i.e. demineralisation plus regeneration. Around 2 l of an acid, preferably citric acid, is passed through the cell for cleaning. This step depends on the feed product. If the feed product contains more fouling (proteins, organic material, . . . ) or scaling components (calcium, oxalates, . . . ) the frequency of cleaning with acid is advantageously increased.

Preferably, the CDI cells are used in at least two groups of at least two cells in series, said at least two groups running in parallel, such as shown in FIG. 1. Using at least two CDI cells in series also enables to remove up to 99% of the ions present in the syrup. Using groups of CDI cells in parallel enables to run the purification process in a continuous way. When one group of cells is being regenerated, the other group is used for purification and vice versa.

The operating pressure is typically less than 2 bars, preferably less than 1.5 bars.

The maximum temperature during operation is 50° C., preferably 40-45° C. However, this depends on the type of CDI cell used and is easily determined by the person skilled in the art.

Preferably the potential difference between the electrodes is from 0.5 to 1.5V, more preferably from 0.7 to 1.4V.

Preferably a filter is installed at the entrance of the CDI cell or cells to avoid that the fine channels and spacers between the different electrode plates are blocked. Preferably a 25 µm filter is used, this is preferably a cartridge type of filter with delta pressure indication to avoid pressurisation of the cartridge in case it becomes fouled.

Compared to a classical syrup demineralisation with ion exchange resin in which the salts are lost into the waste water streams, the current process has an increased yield and reduced operational cost. In classical demineralisation with ion exchange resin, all ions remain on the resins and are being washed out with chemicals during regeneration. This is not the case with the current process as there are no chemicals used and therefore the salts are coming out as originally present. With CDI approximately 50-99%, preferably 60 to 90% of all catalyst ions can be recovered or selectively recovered.

In particular, the process of the present invention can be:

Dextrose syrup from starch hydrolysis is supplied with a suitable magnesium salt to produce a fructose syrup under suitable reaction conditions. The fructose syrup still containing the magnesium salt after the isomerisation reaction is passed through a CDI cell to remove the ions of the magnesium salt. The ions of the magnesium salt are recovered and reused upstream the process and added to dextrose syrup. This recovered magnesium salt is replacing completely or partly the freshly added magnesium salt as is done in conventional process.

Dextrose syrup from starch hydrolysis is supplied with a suitable molybdate or molybdenum salt to produce a mannose syrup under suitable reaction conditions. The mannose syrup containing the molybdenum salt is passed through a CDI cell to remove the ions of the molybdenum salt. The ions of the molybdenum salt are recovered and reused upstream the process and added to dextrose syrup.

Dextrose syrup from starch hydrolysis is supplied into a hydrogenation reactor under suitable reaction conditions to be hydrogenated into sorbitol. In this reactor Raney Nickel is added as catalyst. As a result of the reaction, part of the nickel is solubilised in the sorbitol syrup. The same reaction and conditions are applicable for the reaction starting from mannose which is hydrogenated into mannitol under similar conditions as for sorbitol reaction. The sorbitol or mannitol syrup containing the nickel salt is passed through a CDI cell to remove said salt. Different salts present can be removed either together or selectively and reused or being discharged separately. The nickel is not mixed with other regeneration chemicals and this renders selective disposal easier in case it is required.

Further, the present invention relates to use of CDI to remove charged components from a syrup. Thus the present invention relates to the use of capacitive deionization cell to remove charged components from a syrup. The syrup, the charged components and CDI are defined as described above.

CDI is also a suitable technique to decolourize syrup. Syrup is defined as described above. Thus the present invention further relates to use of CDI to decolourize syrup. Charged colour components can be removed with CDI. Also, due to the presence of the carbon electrode cells other colour components can be removed by adsorption on the carbon electrode.

Another advantage of using CDI instead of conventional resin refining is the fact that when using CDI, the operating conditions and reaction conditions are very mild. When using resin exchange technology the conditions in terms of pH can be very drastic which results in a potential degradation of the product. One example of this is the formation of hydroxyl methyl furfural (HMF) in fructose containing syrups. With CDI there is no change in process conditions such as pH, which results in a stable product during the purification step.

The present invention will be further illustrated in the following examples.

EXAMPLES

Example 1

Three fructose syrup, each at different dry substance content, having a temperature of 43° C., containing Magnesium salt (150 ppm) are separately fed to a CDI cell Plimmer γ (specific surface of 600 to 1100 m²/g, electrical resistivity of 40 mΩ/cm).

The applied voltage is 0.7V. The feed flow is 60 l/h.

Conductivity of the fructose syrups is measured before the syrup enters the CDI unit and at the outlet of the CDI unit, values are indicated in the following table:

| Fructose syrup dry substance | Conductivity of the fructose syrup before the CDI | Conductivity of the fructose syrup at the outlet of the CDI |
| --- | --- | --- |
| 23.2% | 120 µS/cm | 10 µS/cm |
| 26.02% | 159.8 µS/cm | 10 µS/cm |
| 30% | 140 µS/cm | 10 µS/cm |

After approximately 200 l volume the conductivity at the outlet of the CDI is increasing, meaning that the CDI carbon electrodes are getting saturated with ions.

Example 2

Two CDI cells Plimmer γ are operated in parallel. When the conductivity rises above a value of 10 µS/cm, the syrup is fed to the other module and the first module goes into regeneration. The collected product at the outlet of both modules remains below 10 µS/cm. The target conductivity, at which the unit has to switch, can be set at any suitable value as a target setpoint.

Two fructose syrups are purified, one having a dry substance of 30% and the other 26.05%.

The conductivity of the syrup before it enters the CDI cell is measured, conductivity of the syrup at the outlet of the CDI cell is measured and conductivity of the regeneration syrup (or concentrate) coming out of the CDI after the regeneration step is also measured. Values are shown in table below:

|  | Fructose syrup 30% ds Average conductivity (μS/cm) | Fructose syrup 26.05% ds Average conductivity (μS/cm) |
| --- | --- | --- |
| Syrup before the CDI | 140.0 | 159.8 |
| Syrup after the CDI | 43.8 | 39.9 |
| Regeneration syrup | 310.0 | 367.0 |

Example 3

CDI was done at different voltages. Example 2 is repeated with fructose syrup at 30% dry substance but the voltage applied is 0.9V instead of 0.7V.

The conductivity of the syrups is measured at the outlet of the CDI:

With a voltage of 0.7V a conductivity of 30 μS/cm is measured.

With a voltage of 0.9V a conductivity of 20 μS/cm is measured.

What is claimed is:

1. A process to remove charged components from a syrup comprising:
   passing the syrup through a capacitive deionization cell, wherein the specific surface area of the capacitive deionization cell is in the range of 600 to 1100 m$^2$/g and the flow rate of syrup through the capacitive deionization cell is from 50 to 100 l/h, and
   performing a regeneration step comprising releasing charged components from the capacitive deionization cell into a portion of the syrup by inverting the electrode charge of the capacitive deionization cell to form a syrup enriched in charged components, and
   draining the syrup enriched in charged components from the capacitive deionization cell.

2. The process of claim 1 wherein the syrup is a carbohydrate containing syrup and/or a polyol containing syrup.

3. The process of claim 2, wherein the carbohydrate content or the polyol content of the syrup is from 10 weight/weight % (w/w %) to 90 w/w %.

4. The process of claim 1, wherein the charged component is one or more of a carbohydrate isomerisation catalyst, a carbohydrate epimerization catalyst, and a carbohydrate hydrogenation catalyst.

5. The process according to claim 1, further comprising recovering the charged component.

6. The process according to claim 1, further comprising recycling the charged components by reusing the syrup enriched in charged components in a process for catalytic reaction of a sweetener.

7. The process of claim 1, wherein the electrical resistivity of the capacitive deionization cell is around 40 mΩ/cm.

8. The process of claim 2, wherein the carbohydrate content or the polyol content of the syrup is from 20 weight/weight % (w/w %) to 95 w/w %.

9. The process of claim 2, wherein the carbohydrate content or the polyol content of the syrup is from 25 weight/weight % (w/w %) to 95 w/w %.

10. The process of claim 2, wherein the carbohydrate content or the polyol content of the syrup is from 70 weight/weight % (w/w %) to 95 w/w %.

11. The process of claim 2, wherein the carbohydrate content or the polyol content of the syrup is from 75 weight/weight % (w/w %) to 95 w/w %.

12. The process of claim 2, wherein the carbohydrate content or the polyol content of the syrup is from 80 weight/weight % (w/w %) to 95 w/w %.

13. The process of claim 1, wherein the conductivity of the syrup at the outlet of the capacitive deionization cell is 10 μS/cm or less.

14. The process of claim 1, wherein the voltage applied to the capacitive deionization cell is in the range of 0.7 to 1.4 V.

15. A process to remove and recycle charged components from a syrup comprising:
   passing a syrup through a capacitive deionization cell to remove charged components to form a purified syrup;
   performing a regeneration step comprising releasing charged components from the capacitive deionization cell into a portion of the syrup by inverting the electrode charge of the capacitive deionization cell to form a syrup enriched in charged components;
   draining the syrup enriched in charged components from the capacitive deionization cell; and
   recycling the charged components by reusing the syrup enriched in charged components in a process for catalytic reaction of a sweetener.

16. The process of claim 15, wherein the charged component is one or more of a carbohydrate isomerisation catalyst, a carbohydrate epimerization catalyst, and a carbohydrate hydrogenation catalyst.

17. The process of claim 15, wherein the capacitive deionization cell comprises carbon and the electrical resistivity of the capacitive deionization cell is about 40 mΩ/cm.

18. The process of claim 15, wherein the specific surface area of the capacitive deionization cell is in the range of 600 to 1100 m$^2$/g.

19. The process of claim 15 wherein the syrup is a carbohydrate containing syrup and/or a polyol containing syrup.

20. The process of claim 15, wherein the catalytic reaction of a sweetener is an isomerization, an epimerisation, or a hydrogenation reaction.

* * * * *